United States Patent
Hopkinson (10) Patent No.: US 9,811,825 B2
(45) Date of Patent: Nov. 7, 2017

(54) SYSTEMS, METHODS, AND COMPUTER PROGRAM PRODUCTS FOR MANAGING CONTACTLESS TRANSACTIONS

(71) Applicant: GOOGLE INC., Mountain View, CA (US)

(72) Inventor: Emma K. Hopkinson, Ridgefield, CT (US)

(73) Assignee: GOOGLE INC., Mountain View, CA (US)

( * ) Notice: Subject to any disclaimer, the term of this patent is extended or adjusted under 35 U.S.C. 154(b) by 445 days.

(21) Appl. No.: 14/508,348

(22) Filed: Oct. 7, 2014

(65) Prior Publication Data
US 2015/0106186 A1   Apr. 16, 2015

Related U.S. Application Data (60) Provisional application No. 61/889,244, filed on Oct. 10, 2013.

(51) Int. Cl.
*G06Q 30/00*   (2012.01)
*G06Q 20/34*   (2012.01)
(Continued)

(52) U.S. Cl.
CPC ......... *G06Q 20/352* (2013.01); *G06Q 20/204* (2013.01); *G06Q 20/322* (2013.01);
(Continued)

(58) Field of Classification Search
None
See application file for complete search history.

(56) References Cited

U.S. PATENT DOCUMENTS

| | | | |
|---|---|---|---|
| 5,109,409 A | * | 4/1992 | Bomgardner ............ H04Q 1/30 379/257 |
| 5,590,038 A | | 12/1996 | Pitroda ........................ 395/241 |

(Continued)

FOREIGN PATENT DOCUMENTS

| | | |
|---|---|---|
| CA | 2 381 614 A1 | 3/2001 |
| EP | 1 222 503 A2 | 7/2002 |

(Continued)

OTHER PUBLICATIONS

Park, "International Search Report and Written Opinion issued in International Application No. PCT/US2014/059436", dated Jan. 14, 2015, 10 pages.

(Continued)

*Primary Examiner* — Matthew T Sittner
(74) *Attorney, Agent, or Firm* — Johnson, Marcou & Isaacs, LLC

(57) ABSTRACT

Systems, methods, and computer program products are provided for managing contactless transactions. A tap notification including at least a first identifier is received. A first counter in a first data set associated with the first identifier is incremented. It is determined if the first counter matches one of a plurality of thresholds. If it is determined that the first counter matches one of a plurality of thresholds, a first status level in the first data set is updated. A first set of benefits from a plurality of benefits stored in a memory based on the first status level is identified. The first set of benefits is associated with the first identifier.

17 Claims, 4 Drawing Sheets

US 9,811,825 B2
Page 2

(51) Int. Cl.
*G06Q 30/02* (2012.01)
*G06Q 20/20* (2012.01)
*G06Q 20/32* (2012.01)
*G06Q 20/38* (2012.01)

(52) U.S. Cl.
CPC ....... *G06Q 20/3278* (2013.01); *G06Q 20/387* (2013.01); *G06Q 30/0226* (2013.01)

(56) References Cited

U.S. PATENT DOCUMENTS

| | | | |
|---|---|---|---|
| 5,640,002 A | 6/1997 | Ruppert et al. | 235/472 |
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/384 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B2 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| RE45,006 E * | 7/2014 | Deaton | G06Q 20/20 705/14.38 |
| 9,223,297 B2 * | 12/2015 | Nielsen | G05B 1/00 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0050831 A1* | 3/2003 | Klayh | G06Q 20/06 705/14.12 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0135793 A1* | 7/2003 | Craig | G11C 16/349 714/42 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2004/0211600 A1* | 10/2004 | Schuller | G01G 19/4144 177/25.15 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0277100 A1* | 12/2006 | Parham | G06Q 30/0212 705/14.14 |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0150568 A1* | 6/2007 | Ruiz | H04L 12/2697 709/223 |
| 2007/0198432 A1 | 8/2007 | Pitroda et al. | 705/64 |
| 2007/0219863 A1* | 9/2007 | Park | G06Q 10/10 705/14.11 |
| 2008/0201231 A1* | 8/2008 | Bistriceanu | G06Q 30/02 705/14.26 |
| 2008/0295105 A1* | 11/2008 | Ozer | G06F 9/3851 718/103 |
| 2008/0306849 A1 | 12/2008 | Johnson, Jr. et al. | 705/35 |
| 2008/0311894 A1* | 12/2008 | Klein | H04L 41/22 455/414.2 |
| 2009/0108064 A1 | 4/2009 | Fernandes et al. | 235/380 |
| 2009/0164322 A1 | 6/2009 | Khan et al. | 705/14 |
| 2010/0010964 A1* | 1/2010 | Skowronek | G06Q 30/02 707/E17.108 |
| 2010/0082420 A1 | 4/2010 | Trifiletti et al. | |
| 2010/0239249 A1* | 9/2010 | Sun | H04Q 3/0062 398/45 |
| 2010/0241494 A1 | 9/2010 | Kumar et al. | 705/14.1 |
| 2010/0250583 A1* | 9/2010 | Klemm | G06Q 10/10 707/769 |
| 2010/0253556 A1* | 10/2010 | Biran | H03M 7/40 341/65 |
| 2011/0060637 A1 | 3/2011 | Sakai et al. | |
| 2011/0073663 A1 | 3/2011 | Narendra et al. | 235/492 |
| 2011/0161148 A1* | 6/2011 | Schmidt | G06Q 30/02 705/14.16 |
| 2011/0166992 A1* | 7/2011 | Dessert | G06Q 20/0655 705/39 |
| 2011/0171996 A1 | 7/2011 | Narendra et al. | 455/558 |
| 2011/0208576 A1* | 8/2011 | Durgin | G06Q 30/02 705/14.38 |
| 2011/0218868 A1* | 9/2011 | Young | G06Q 20/045 705/16 |
| 2011/0223972 A1 | 9/2011 | Narendra et al. | 455/558 |
| 2011/0231238 A1 | 9/2011 | Khan et al. | 705/14.26 |
| 2011/0244796 A1* | 10/2011 | Khan | H04W 4/008 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0029990 A1* | 2/2012 | Fisher | G06Q 20/105 705/14.19 |
| 2012/0064828 A1 | 3/2012 | Khan et al. | 455/41.1 |

(56) References Cited

U.S. PATENT DOCUMENTS

| | | | |
|---|---|---|---|
| 2012/0089471 A1* | 4/2012 | Comparelli | G06Q 20/20 705/18 |
| 2012/0109764 A1 | 5/2012 | Martin et al. | 705/17 |
| 2012/0130791 A1* | 5/2012 | Carter | G06Q 30/0225 705/14.26 |
| 2012/0150669 A1* | 6/2012 | Langley | G06Q 30/0601 705/16 |
| 2012/0184363 A1* | 7/2012 | Barclay | G06Q 10/10 463/25 |
| 2012/0203610 A1* | 8/2012 | Grigg | G06Q 30/06 705/14.23 |
| 2012/0215637 A1* | 8/2012 | Hermann | G06Q 30/0207 705/14.53 |
| 2012/0323664 A1 | 12/2012 | Klems | 705/14.26 |
| 2012/0330737 A1 | 12/2012 | Liberty | |
| 2012/0330830 A1* | 12/2012 | Mason | G06Q 20/36 705/41 |
| 2013/0035036 A1* | 2/2013 | Fisher | G06Q 20/32 455/41.1 |
| 2013/0054412 A1 | 2/2013 | Brendell et al. | |
| 2013/0085881 A1 | 4/2013 | Chary et al. | |
| 2013/0124272 A1* | 5/2013 | Hohti | G06Q 30/0231 705/14.3 |
| 2013/0159073 A1* | 6/2013 | Shah | G06Q 30/0276 705/14.1 |
| 2013/0218658 A1* | 8/2013 | Crowe | G06Q 30/02 705/14.33 |
| 2013/0262214 A1* | 10/2013 | Baird | G06Q 30/0207 705/14.33 |
| 2013/0311900 A1* | 11/2013 | Schleier-Smith | H04L 65/403 715/753 |
| 2013/0317924 A1 | 11/2013 | Bush et al. | 705/16 |
| 2013/0317927 A1 | 11/2013 | Bush et al. | 705/21 |
| 2014/0012749 A1* | 1/2014 | Lee | G06Q 20/367 705/40 |
| 2014/0032312 A1 | 1/2014 | Johnson et al. | 705/14.47 |
| 2014/0040125 A1* | 2/2014 | Kunz | G06Q 20/105 705/41 |
| 2014/0074616 A1 | 3/2014 | Johnson et al. | 705/14.64 |
| 2014/0180826 A1* | 6/2014 | Boal | G06Q 30/0245 705/14.66 |
| 2014/0200973 A1* | 7/2014 | Webb | G06Q 10/00 705/14.16 |
| 2015/0032522 A1* | 1/2015 | Dintenfass | G06Q 30/0215 705/14.17 |
| 2015/0106186 A1* | 4/2015 | Hopkinson | G06Q 20/352 705/14.27 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| JP | 2010-218027 A | 9/2010 |
| KR | 10-2011-0092470 A | 8/2011 |
| WO | WO 01/18629 A3 | 3/2001 |
| WO | WO 03/012717 A1 | 2/2003 |
| WO | 2015/054207 A1 | 4/2015 |

OTHER PUBLICATIONS

Wittmann-Regis, "International Preliminary Report on Patentability issued in International Application No. PCT/US2014/059436", dated Apr. 21, 2016, 7 pages.

Adhikari, "Australian Office Action issued in Australian Application No. 2014332179", dated Dec. 16, 2016, 7 pages.

Ziaie, "Canada Office Action received for Canada Patent Application No. 2,926,717", dated Jan. 31, 2017, 3 pages.

Adhikari, "Australian Office Action issued in Australian Application No. 2014332179", dated May 25, 2017, 4 pages.

Adhikari, "Australian Office Action issued in Australian Application No. 2014332179", dated Aug. 4, 2017, 4 pages.

* cited by examiner

SYSTEMS, METHODS, AND COMPUTER PROGRAM PRODUCTS FOR MANAGING CONTACTLESS TRANSACTIONS

CROSS REFERENCE TO RELATED APPLICATION

This application claims priority to U.S. Provisional Patent Application No. 61/889,244, filed Oct. 10, 2013, the entire contents of which are incorporated herein by reference.

BACKGROUND

Field

The present invention generally relates to systems, methods, and computer program products for managing contactless transactions.

Related Art

Wireless technologies such as near field communications (NFC) standards are increasingly being used to exchange data between devices when placed within a predetermined distance from each other. One use of such technologies is for making contactless transactions including for payments, offers, ticketing, and the like. For example, an NFC-enabled mobile device can include or store information such as payment credentials, commerce benefits (e.g., offers, coupons, loyalty awards, vouchers, rewards, discounts, promotions), and tickets (e.g., train tickets, movie tickets), which are issued by corresponding service providers (e.g., credit card company, merchant, transit authority). Such information can be managed by one or more applets and/or applications (e.g., mobile wallet application) deployed on the mobile device.

The mobile device can, in turn, use the NFC technology to communicate with other NFC-enabled devices such as reader terminals on point-of-sale (PoS) or admissions systems. For example, to redeem an offer and/or make a payment, a mobile device is placed (e.g., by its user) within approximately ten centimeters (or another predetermined and technologically feasible distance) of the reader terminal. Upon being placed within the predetermined distance, the mobile device and reader terminal become communicatively coupled and exchange a number of communications and information to process the requested contactless transaction. Placing the mobile device within a predetermined proximity to the reader terminal so that they can be communicatively coupled is often referred to as performing a "tap" or "wave". Performing a "tap" or "wave" is described in more detail in U.S. Patent Application Publication Nos. US 2013/0317924 A1 and US 2013/0317927 A1, the contents of which are incorporated herein by reference in their entirety.

Mobile wallet applications on mobile devices are used to centrally manage contactless transactions from a mobile device. For example, mobile wallet applications can manage other applets (e.g., payment applets, security applets) and data (e.g., payment credentials, offers, loyalty rewards) that are used during contactless transactions. That is, mobile wallet applications can control when a certain applet is to be used and when certain credentials or data are communicated with other devices (e.g., reader terminals).

Typically, data such as benefits (e.g., coupons, loyalty rewards, promotions, discounts, certificates, gifts) that are stored on mobile devices for use by mobile wallet applications are openly available to mobile wallet applications and their users. For example, an offer issued by a merchant can be obtained and used by any mobile wallet application.

Given the foregoing, it would be beneficial to distinguish between mobile wallet applications and distribute offers to certain mobile wallet applications based on predetermined criteria. Further, it would be beneficial to assign and manage a status for applications based on the frequency of use of those applications.

BRIEF DESCRIPTION

The example embodiments presented herein meet the above-identified needs by providing systems, methods, and computer program products for managing contactless transactions.

In one example embodiment, a system for managing contactless transactions comprises at least one memory and a processor. The memory is operable to store a plurality of benefits and a plurality of data sets associated with a corresponding identifier. Each data set includes at least a counter and a status level. The processor is coupled to the at least one memory. A tap notification including at least a first identifier is received. A first counter in a first data set associated with the first identifier is incremented. It is determined if the first counter matches one of a plurality of thresholds. A first status level in the first data set is incremented, if it is determined that the first counter matches one of the plurality of thresholds. A first set of benefits from the plurality of benefits based on the first status level is identified. The first set of benefits is associated with the first identifier.

In another example embodiment, a method for managing contactless transactions comprises steps of: receiving a tap notification, the tap notification including at least a first identifier; incrementing a first counter in a first data set associated with the first identifier; determining if the first counter matches one of a plurality of thresholds; updating a first status level in the first data set, if it is determined that the first counter matches one of a plurality of thresholds; identifying a first set of benefits from a plurality of benefits stored in a memory based on the first status level; and associating the first set of benefits with the first identifier.

In yet another example embodiment, a non-transitory computer-readable medium has stored thereon sequences of instructions which when executed by a computer system cause the computer system to: receive a tap notification, the tap notification including at least a first identifier; increment a first counter in a first data set associated with the first identifier; determine if the first counter matches one of a plurality of thresholds; update a first status level in the first data set, if it is determined that the first counter matches one of a plurality of thresholds; identify a first set of benefits from a plurality of benefits stored in a memory based on the first status level; and associate the first set of benefits with the first identifier.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

The example embodiments presented herein are directed to systems, methods, and computer program products for managing contactless transactions, which are described herein in terms providing offers based on numbers of contactless transactions performed. This description is not intended to limit the application of the example embodiments presented herein. In fact, after reading the following description, it will be apparent to one skilled in the relevant art(s) how to implement the following example embodiments in alternative embodiments in which other types of data (e.g., loyalty rewards, spending points, admissions tickets, transportation tickets, gaming lives) are assigned and/or provided based on other criteria (e.g., spend, duration of visit).

The terms "tap," "tap event" and/or the plural form of these terms are used interchangeably herein to refer to the act of placing an NFC-enabled device (e.g., mobile device) within a predetermined proximity of another NFC-enabled device (e.g., terminal reader).

The terms "benefit," "commerce benefit," and/or the plural form of these terms are used interchangeably herein to refer to a benefit that may be stored, used and/or applied by a mobile wallet application during a contactless transaction, including offers, loyalty awards, discounts, promotions, certificates gifts, multipliers, and the like.

II. System

Figure 1:
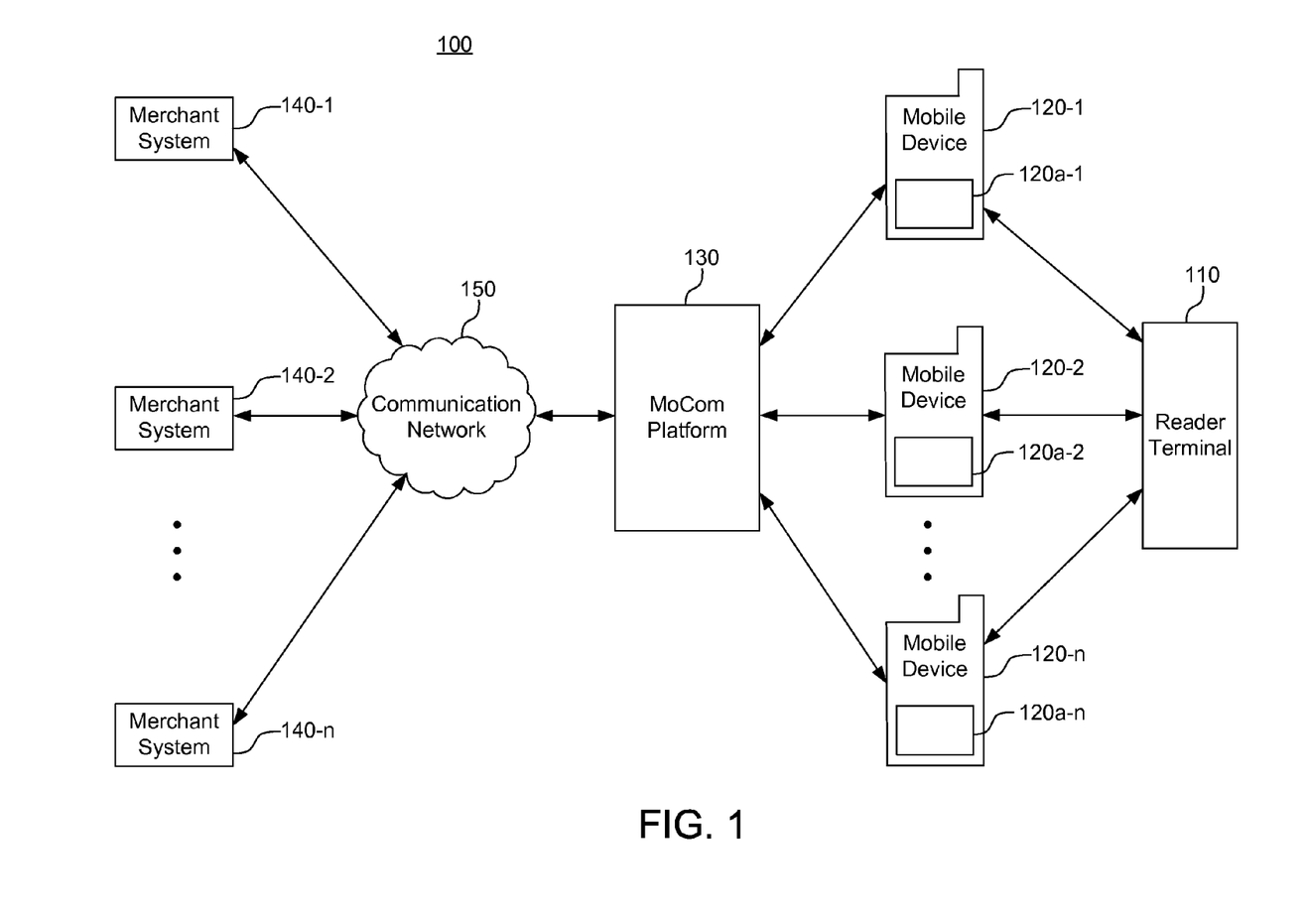
FIG. 1 is a diagram of a system for managing contactless transactions, according to an exemplary embodiment.

FIG. 1 is a diagram of a system 100 for managing contactless transactions, according to an exemplary embodiment. As shown in FIG. 1, system 100 includes a reader terminal 110, mobile devices 120-1, 120-2, . . . , 120-n (collectively "120" or "mobile device(s) 120"), a mobile commerce (MoCom) platform 130, and merchant system 140-1, 140-2, . . . , 140-n (collectively "140" or "merchant systems 140").

Mobile devices 120 may be, for example, a cellular phone, tablet or the like. Although not illustrated in FIG. 1, each mobile device 120 includes a processor, memory, a contactless frontend (CLF), a baseband modem, and a user interface such as a display screen. A baseband modem is a digital modem that is used for mobile network communications. A CLF is circuitry which handles the analog aspect of contactless or NFC communications and the communication protocol layers of a contactless transmission link. A CLF also is used to exchange data between reader 110 and other storage devices in and/or associated with mobile devices. For example, a CLF may be used to communicate with a secure element (e.g., subscriber identity module (SIM) card) on a mobile device. A secure element may be implemented as a Universal Integrated Circuit Card (UICC), embedded SE card, secure micro secure digital (microSD) card, and the like. A secure element may also be implemented as a virtual system such as a cloud-based architecture or host card emulation (HCE).

Mobile devices 120-1, 120-2, . . . , 120-n include or have stored in their memory, mobile wallet applications 120a-1, 120a-2, . . . , 120a-n, respectively, (collectively "120a" or "mobile wallet applications 120a"), which include instructions that when executed by the processor of the corresponding mobile device 120, cause the mobile device to act as an instrument, for example, for processing contactless transactions.

Contactless transactions may be performed between mobile devices 120 and reader terminal 110, using wireless communications technologies such as NFC. The reader terminal 110 is an NFC-enabled system located, for example, at a point of sale (PoS) terminal and which is used to process a contactless transaction. In one exemplary embodiment, the reader terminal 110 receives a contactless transaction request when a mobile device (e.g., mobile device 120-1) is tapped, waved or placed within a predetermined proximity of the reader terminal 110. The reader terminal 110, in turn, exchanges data over one or more communications with the mobile device 120-1 to complete the contactless transaction. In one exemplary embodiment, during a contactless transaction, a mobile device initiates a tap event and, in turn, transmits offer data to the reader terminal 110 to be applied to the transaction. That is, if the offer data includes a discount, that discount is applied to the balance and the transaction is finalized with a modified (e.g., reduced) balance.

Although only one reader terminal (reader terminal 110) is shown, it should be understood that system 100 may comprise any number of reader terminals.

Commerce benefits (e.g., offers) used during a contactless transaction may be managed by the MoCom platform 130. In one example embodiment, The MoCom platform 130 may include one or more servers, which in turn may include one or more databases (e.g., offer database), for storing offers or offer data, and is configured to manage (e.g., transmit, receive, request, process) offers and their related data. In one exemplary embodiment, the MoCom platform 130 may store and manage mobile commerce data (e.g., offer data, loyalty data, rewards data), merchant data (e.g., information related to merchants associated with commerce data), and rules and/or means for processing redeemed offers, distributing offers to mobile wallet applications, and the like. Examples of data that may be stored by the MoCom platform 130 are described below in further detail with reference to FIG. 2.

The MoCom platform 130 may be a standalone platform, or may be part of a mobile wallet system and/or architecture. The mobile wallet system and/or architecture may include other systems such as a trusted service manager (TSM) and an enterprise service bus (ESB). An ESB and TSM are systems that provide interfaces and/or communications means between multiple systems. For example, an ESB can be used by a MoCom platform 130 to communicate with mobile wallet applications 120a on mobile devices 120. In one exemplary embodiment, the MoCom platform 130 may transmit an offer and/or offer data to a mobile wallet application 120a-1.

The MoCom platform 130 is communicatively coupled to merchant systems 140 over a communications network 150. A merchant system is a system, platform, computer architecture or the like, managed by a merchant (e.g., business, retailer). The merchant system may include a customer relationship marketing (CRM) system, which is used to analyze, manage and distribute offers. In one exemplary embodiment, a merchant system creates an offer and transmits that offer to the MoCom platform 130 to be certified, configured, stored and/or distributed to mobile wallet applications 120a. The creation and management of offers is described in further detail in U.S. Patent Application Publication Nos. US 2014/0032312 and US 2014/0074616, which are incorporated herein by reference in their entirety.

III. Process

Figure 2:
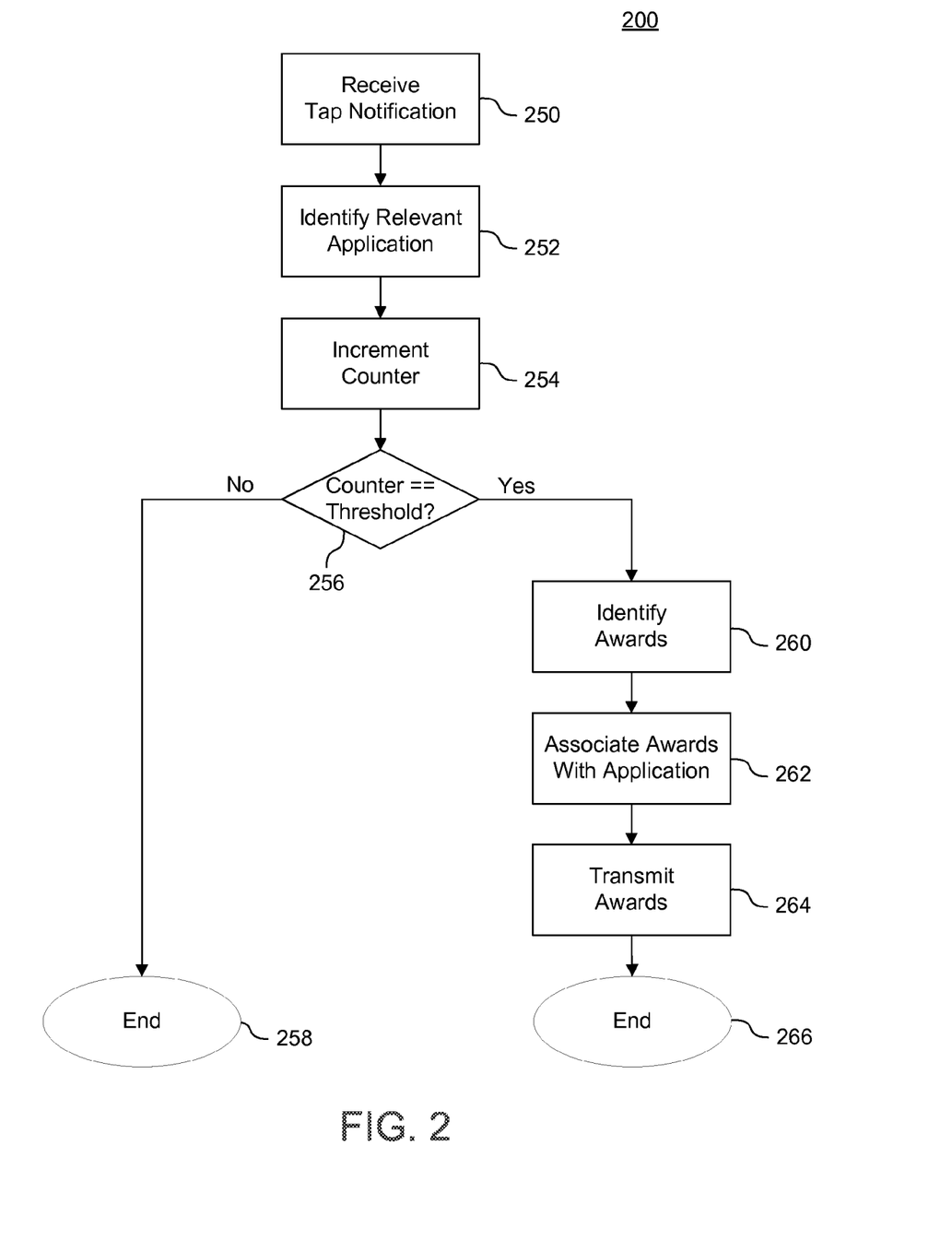
FIG. 2 is a flow chart illustrating a process for managing contactless transactions, according to an exemplary embodiment.

FIG. 2 is a flow chart illustrating a process 200 for managing contactless transactions, according to an exemplary embodiment. In particular, managing contactless transactions includes assigning status levels and providing offers to mobile wallet applications based on a number of taps performed by each mobile wallet application.

At block 250, a MoCom platform (e.g., FIG. 1, MoCom platform 130) receives a tap notification from a mobile device (e.g., FIG. 1, mobile device 120-1). The tap notification indicates that a contactless transaction has been initiated, processed and/or completed by a mobile wallet application (e.g., FIG. 1, mobile wallet application 120a-1), for example, at a reader terminal (e.g., FIG. 1, reader terminal 110). The tap notification includes information identifying the mobile device and/or mobile wallet application used to perform the tap. Such identifying information may be, for example, an application identifier (ID) (e.g., mobile wallet ID) corresponding to the mobile wallet application, or other information used to identify the mobile device (e.g., mobile device ID) on which the mobile wallet application is stored. A mobile device ID may be an international mobile equipment identity (IMEI), a mobile equipment identifier (MEID), a Media Access Control (MAC) address, or a similar unique serial number associated with hardware of a mobile device. The tap notification may include other information identifying, for example, a location, reader terminal, merchant, and time where the tap occurred.

It should be understood that the tap notification received by the MoCom platform at block 250 may alternatively and/or additionally be received from a merchant system (e.g., merchant system 140-1) or the reader terminal.

In turn, at block 252, the MoCom platform uses the information included in the tap notification to identify a set (or sets) of data (e.g., offer data) associated with the mobile wallet applications. In one exemplary embodiment, the MoCom platform queries one or more of its databases to locate a counter of a data set associated with the mobile wallet ID included in the tap notification. At block 254, the MoCom platform increments the counter when the tap notification is received from a mobile wallet application or mobile device. When other tap notifications are received from a mobile wallet application or mobile device the MoCom platform similarly increments the counter.

In one exemplary embodiment, a value n of a counter associated with the mobile wallet application x is incremented by one, as shown in the following formula:

$$\text{counter}(x) = ++n$$

At block 256, the MoCom platform determines whether the incremented counter has reached a predetermined threshold. A threshold may be a predetermined value corresponding to a status level or membership level. Table 1 below illustrates a threshold table in accordance with an exemplary embodiment:

TABLE 1

| Threshold Ref. No. | Threshold Value | Status Level | Membership Level |
|---|---|---|---|
| 1 | 100 | 1 | Gold |
| 2 | 1,000 | 2 | Silver |
| 3 | 10,000 | 3 | Platinum |

As shown in Table 1, a threshold is a numeric value identifying the number of taps needed to reach a status level or membership level. For example, when a mobile wallet application is used to perform 1000 taps (e.g., counter(x) =1000), the status level and membership level of a mobile wallet application are modified accordingly. Table 2 below illustrates a mobile wallet application record which may be stored by the MoCom platform to track and manage, among other things, the status and membership levels of a mobile wallet application, in accordance with an exemplary embodiment:

TABLE 2

| Application ID | Status Level | Membership Level |
|---|---|---|
| 001 | 1 | Gold |
| 002 | 1 | Gold |
| 003 | 2 | Silver |

As shown in Table 2, the mobile wallet application with application ID "001" has been used to perform at least 100 taps (but less than 1000) and has been assigned a status level "1" and "gold" membership level. Although not illustrated in Table 2, a mobile wallet record may also include information such as a mobile device ID (e.g., IMEI, MEID, MAC Address) or any other information that may be used to identify the mobile device associated with the application ID, as well as a date and time when a status level and/or membership level is reached.

To determine, at block 256, whether a mobile wallet application has reached a threshold, the MoCom platform compares the counter of the mobile wallet application to the threshold values in the threshold table. In one exemplary embodiment, determining whether a mobile wallet application has reached (e.g., matches) a threshold is performed in accordance with the following process described below using pseudocode:

```
while y < thresholdMAX
    if counter(x) == threshold(y)
        statuslevel(x) = y
    else
        ++y
```

As illustrated above, y represents the reference number of a threshold; thresholdMAX represents the reference number of the last (e.g., highest) threshold in a list of predetermined thresholds (e.g., 3 in Table 1); counter represents the counter value of a mobile wallet application; x represents the application ID corresponding to a mobile wallet application; and statuslevel represents the value of the status level associated with a mobile wallet application.

If the MoCom platform determines, at block 256, that the counter of the mobile wallet application has not reached a threshold, the process ends (block 258) and the status level and membership levels of the mobile wallet application are not modified. On the other hand, if the MoCom platform determines, at block 256, that the counter of the mobile wallet application has reached a threshold (e.g., the threshold value equals the counter value), the MoCom platform identifies, at block 260, benefits (e.g., offers) associated with the threshold level reached.

That is, at block 260, the MoCom platform uses the threshold reference number and/or status level to identify benefits that are associated with the threshold reached. This may be accomplished by performing a query in an offer database to identify offers having a threshold reference number or status level equal to the threshold reference number or status level, respectively, of the mobile wallet application having reached a threshold. In one exemplary embodiment, if a mobile wallet application reaches the first threshold shown in Table 1, the MoCom platform, at block 260, identifies offers in the offers database that (1) have a threshold reference number equal to "1", or (2) have a status level equal to "1".

If the MoCom platform identifies, at block 260, any offers in the offer database that are associated with the threshold reached by the mobile wallet application, the MoCom platform associates the mobile wallet application with those offers. In one exemplary embodiment, the set of offers identified at block 260 may be flagged using the application identifier of the mobile wallet application or a mobile device identifier of the mobile device on which the mobile wallet application is stored.

At block 264, the mobile wallet application may transmit the offers associated with the mobile wallet application at block 262, to the mobile device on which the mobile wallet application is stored. The offers may be transmitted to and stored on (e.g. pushed) the mobile device at a time determined by the MoCom platform. Alternatively, the offers may be transmitted to the mobile device upon receipt of a request front the mobile wallet application (e.g., pulled). Data may be transmitted to the mobile device over a communications network either directly, or via a supplementary system (e.g., ESB).

Transmitting an offer includes sending at least a portion of offer data associated with an offer. Table 3 below illustrates data stored in association with an offer (e.g., data that makes up an offer), in accordance with an exemplary embodiment:

TABLE 3

| Element | Description |
| --- | --- |
| OFFER_ID | Unique identifier associated with an offer, assigned by a MoCom |
| EXT_OFFER_ID | Unique identifier associated with an offer, assigned by a merchant or merchant system associated with the offer |
| OFFER_NAME | Label or caption associated with an offer |
| TITLE | Title associated with an offer |
| SHORT_DESCRIPTION | Brief description of an offer and its terms |
| LONG_DESCRIPTION | Detailed description of an offer and its terms |
| SMALL_IMAGE_URI | Unique identifier associated with an small-size image corresponding to an offer |
| LARGE_IMAGE_URI | Unique identifier associated with a large-size image corresponding to an offer |
| BARCODE_ID | Identifier associated with a barcode (or QR code) corresponding to an offer |
| UPCCODE | Type of barcode |
| TERMS_AND_CONDITIONS | Terms and conditions associated with an offer |
| IS_REDEEMABLE | Indicator of whether an offer is in a state in which it can be used/redeemed in a transaction |
| STATUS | State of an offer (e.g., ready for review, live, expired) |
| USER_ID | Unique identifier associated with a user of a mobile device |
| CREATE_TSTMP | Date and time a record is created |
| UPDATE_TSTMP | Date and time a record is created |
| THRESHOLD_REF_ID | Value of one or more membership levels of a mobile wallet application at which an offer may be obtained and/or redeemed |
| STATUS_LEVEL | Value of one or more status levels of a mobile wallet application at which an offer may be obtained and/or redeemed |

The threshold reference number (e.g. THRESHOLD_REF_ID) and status level (e.g., STATUS_LEVEL) associated with an offer may be assigned either by the merchant or merchant system that created the offer, or by the MoCom platform during the lifecycle of the offer, which is managed by the MoCom platform. That is, offers that are stored on the MoCom platform and ready to be deployed to mobile devices may be modified so as to assign and/or edit their respective information, including threshold reference number and status level. In one exemplary embodiment, an offer may have multiple threshold reference numbers and status levels, so that the offer may be assigned and transmitted to a mobile wallet application when the mobile wallet application reaches one of multiple thresholds.

In turn, the mobile device receives and stores the received offers (e.g., offer data) and makes those offers available for use in a contactless transaction.

Figure 3:
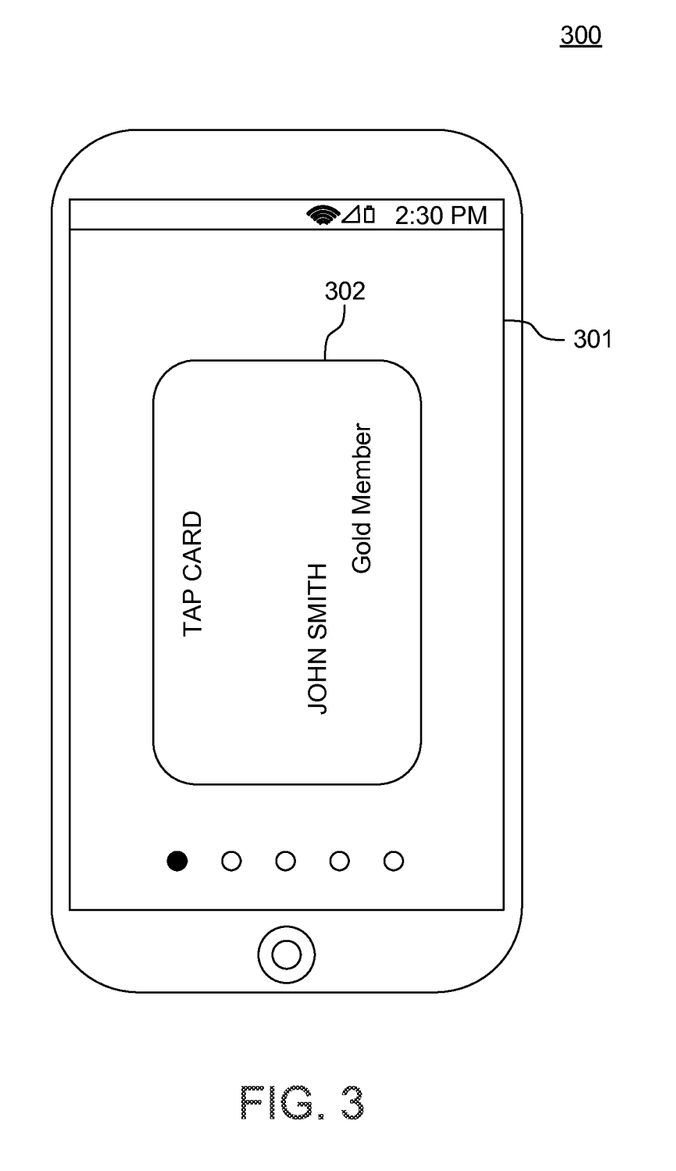
FIG. 3 is a diagram of a system including an interface for providing membership level information, according to an exemplary embodiment.

FIG. 3 is a diagram of a mobile device 300 including an interface for providing membership level information, according to an exemplary embodiment. The mobile device 300 (e.g., FIG. 1, mobile device 120) may be a cellular phone, tablet and/or the like. Mobile devices are described above in detail with reference to FIG. 1. The mobile device 300 includes a processor and memory. A mobile wallet application may be installed on the memory of the mobile device 300, and can be used to manage the membership program and information related to the membership program. Membership programs are discussed above in more detail with reference to FIG. 2.

The mobile device 300 also includes an interface (e.g., user interface) 301, which may be used to display (e.g., output) and/or receive (e.g., input) information. In one example embodiment, the interface displays a card 302 (e.g., membership program card) corresponding to a membership program. The displayed card 302 may be in the shape of a credit, debit, loyalty card and/or the like. The displayed card 302 may include the name of the membership program (e.g., Tap Card), name of the user associated with the membership program and/or mobile wallet application (e.g., John Smith), and the membership level of the mobile wallet application in the membership program (e.g., Gold Member). The card 302 is displayed in accordance with membership program information received and stored by the mobile device.

The mobile device 300 receives membership program information from a system such as a MoCom platform (e.g., FIG. 1, MoCom platform 130). The membership program information includes an application identifier corresponding to the mobile wallet stored on the mobile device. The membership program information also includes the membership level to be associated with the mobile wallet application. As discussed in more detail above with reference to FIG. 2, the membership level corresponds to a status level and/or threshold level assigned by reaching predefined criteria (e.g., number of taps). In one example embodiment, the membership program information is transmitted by the MoCom platform to the mobile device when the mobile wallet application reaches a threshold.

The mobile device 300 receives the membership program information from the MoCom platform and compares it to previously stored membership program information associated with the mobile wallet application. If indeed there is a change and/or update, the mobile wallet application updates the membership program information and displays the card 302 accordingly. That is, if the membership level of the membership program information is updated from "Gold" to "Silver," various elements of the card 302 may be displayed differently in accordance with the change. For example, the shape, image and/or text of the card 302 may be modified to show a silver-colored card that reads "Silver Member," in the event that the mobile wallet application reaches that threshold.

In one example embodiment, performing an action on the card 302 (e.g., tapping the card 302 via the user interface 301) causes the card to flip and display membership program information, status level, date reached, counter value, difference between counter value and the next threshold to be reached, and/or similar information.

Example Computer-Readable Implementation

The example embodiments described above such as, for example, the systems and procedures depicted in or discussed in connection with FIGS. 1-3 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 4:
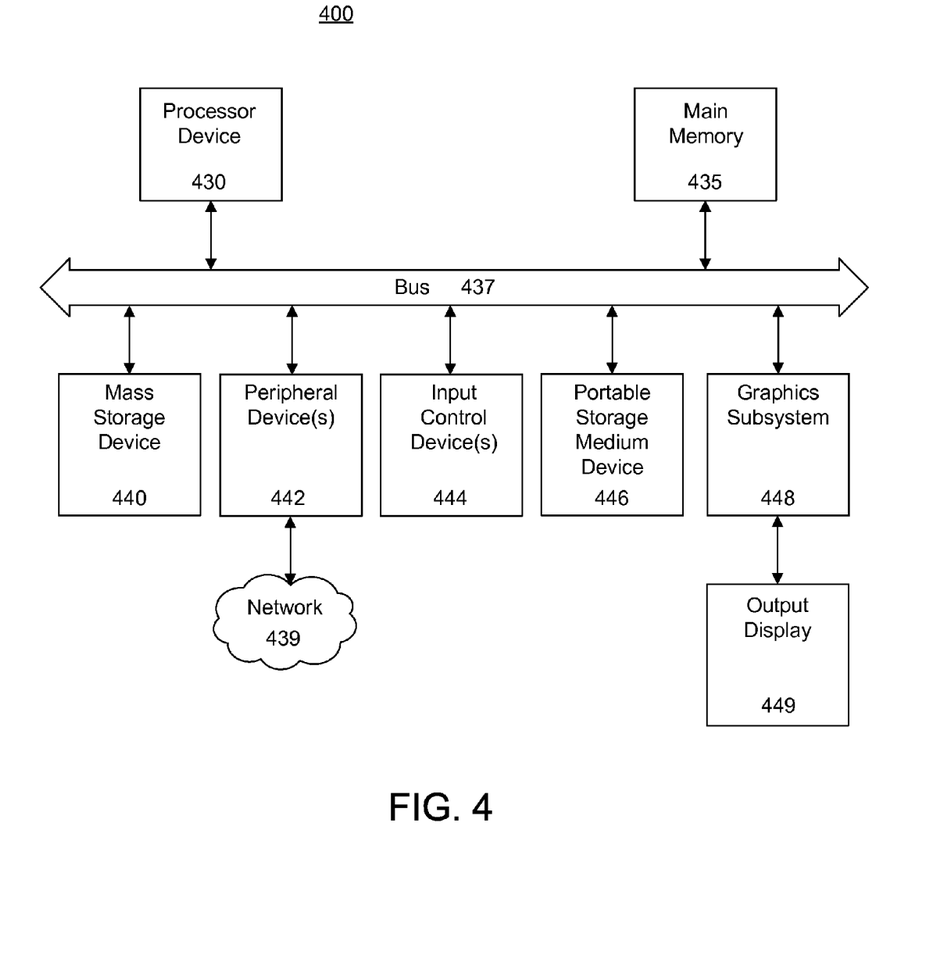
FIG. 4 is a block diagram of an exemplary system useful for implementing the present invention.

FIG. 4 is a block diagram of a general and/or special purpose computer 400, in accordance with some of the example embodiments of the invention. The computer 400 may be, for example, a user device, a user computer, a client computer and/or a server computer, among other things.

The computer 400 may include without limitation a processor device 430, a main memory 435, and an interconnect bus 437. The processor device 430 may include without limitation a single microprocessor, or may include a plurality of microprocessors for configuring the computer 400 as a multi-processor system. The main memory 435 stores, among other things, instructions and/or data for execution by the processor device 430. The main memory 435 may include banks of dynamic random access memory (DRAM), as well as cache memory.

The computer 400 may further include a mass storage device 440, peripheral device(s) 442, portable storage medium device(s) 446, input control device(s) 444, a graphics subsystem 448, and/or an output display 449. For explanatory purposes, all components in the computer 400 are shown in FIG. 4 as being coupled via the bus 437. However, the computer 400 is not so limited. Devices of the computer 400 may be coupled via one or more data transport means. For example, the processor device 430 and/or the main memory 435 may be coupled via a local microprocessor bus. The mass storage device, 440, peripheral device(s) 442, portable storage medium device(s) 446, and/or graphics subsystem 448 may be coupled via one or more input/output (I/O) buses. The mass storage device 440 may be a nonvolatile storage device for storing data and/or instructions for use by the processor device 430. The mass storage device 440 may be implemented, for example, with a magnetic disk drive or an optical disk drive. In a software embodiment, the mass storage device 440 is configured for loading contents of the mass storage device 440 into the main memory 435.

The portable storage medium device 446 operates in conjunction with a nonvolatile portable storage medium, such as, for example, a compact disc read only memory (CD-ROM), to input and output data and code to and from the computer 400. In some embodiments, the software for storing an internal identifier in metadata may be stored on a portable storage medium, and may be inputted into the computer 400 via the portable storage medium device 446. The peripheral device(s) 442 may include any type of computer support device, such as, for example, an input/output (I/O) interface configured to add additional functionality to the computer 400. For example, the peripheral device(s) 442 may include a network interface card for interfacing the computer 400 with a network 439.

The input control device(s) 444 provide a portion of the user interface for a user of the computer 400. The input control device(s) 444 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 400 may include the graphics subsystem 448 and the output display 449. The output display 449 may include a cathode ray tube (CRT) display and/or a liquid crystal display (LCD). The graphics subsystem 448 receives textual and graphical information, and processes the information for output to the output display 449.

Each component of the computer 400 may represent a broad category of a computer component of a general and/or special purpose computer. Components of the computer 400 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures. Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage benefits associated with updated status levels for wallet applications, comprising:
    a mobile computing device comprising a user interface, a wallet application, a mobile storage device, and a mobile processor communicatively coupled to the mobile storage device; and
    a computing system comprising a storage device and a processor communicatively coupled to the storage device, wherein the processor executes application code instructions that are stored in the storage device to cause the computing system to:
        receive a tap notification comprising a first identifier;
        determine a wallet application associated with the first identifier;
        increment a counter associated with the first identifier;
        determine that the incremented counter exceeds one of a plurality of thresholds;
        determine a new status level associated with the incremented counter that exceeds the one of the plurality of thresholds;
        associate the new status level with the wallet application; and
        identify one or more offers that correspond to the new status level;
    wherein the mobile processor executes application code instructions that are stored in the mobile storage device to cause the wallet application to:
        update membership program information associated with a prior status level to new membership program information associated with the new status level; and
        update a visual element of a membership card displayed by the mobile computing device from a first visual element associated with the prior status level to a new visual element associated with the new status level.

2. The system of claim 1, wherein the processor is further configured to execute application code instructions stored in the storage device to cause the computing system to transmit the new status level to the mobile computing device.

3. The system of claim 1, wherein the tap notification is received from one of the mobile computing device or a merchant computing system.

4. The system of claim 1, wherein the processor is further configured to execute application code instructions stored in the storage device to cause the computing system determine a new set of benefits associated with the new status level.

5. The system of claim 1, wherein the visual elements comprise one or more of a color and shape of the displayed membership card.

6. A method to manage benefits associated with updated status levels for wallet applications, comprising:
    receiving, by a computing device, a transaction notification comprising a first identifier;
    determining, by the computing device, a wallet application associated with the first identifier;
    incrementing, by the computing device, a counter associated with the wallet application based on the transaction notification;
    determining, by the computing device, that the incremented counter exceeds one of a plurality of thresholds;
    determining, by the computing device, an updated status level associated with the incremented counter exceeding the one of a plurality of thresholds;
    determining, by the computing device, a new set of benefits associated with the updated status level;
    associating, by the computing device, the new set of benefits with the wallet application, wherein the wallet application updates program information associated with a prior status level to new program information associated with the updated status level and wherein updating the program information comprises changing visual elements of a membership card displayed by a mobile computing device; and
    identifying, by the computing device, one or more offers that correspond to the updated status level.

7. The method according to claim 6, further comprising transmitting, by the computing device, at least a portion of the new set of benefits to a mobile computing device associated with the wallet application.

8. The method according to claim 6, further comprising transmitting, by the computing device, the updated status level to a mobile computing device associated with the wallet application.

9. The method according to claim 6, wherein the transaction notification is received from one of a mobile computing device or a merchant computing device.

10. The method according to claim 6, wherein the new set of benefits comprises a new membership status level.

11. The method according to claim 10, further comprising determining, by the wallet application, that the new membership status level is different than a prior membership status level.

12. The method according to claim 6, wherein the visual elements comprise one or more of a color and shape of the displayed membership card.

13. A computer program product, comprising:
    a non-transitory computer-readable medium having computer-readable program instructions embodied therein that when executed by a computer cause the computer to manage benefits associated with updated status levels for wallet applications, the computer-readable program instructions comprising:
        computer-readable program instructions to receive a transaction notification comprising a first identifier;

computer-readable program instructions to determine a wallet application associated with the first identifier;
computer-readable program instructions to increment a counter associated with the wallet application based on the transaction notification;
computer-readable program instructions to determine that the counter exceeds one of a plurality of thresholds;
computer-readable program instructions to determine an update a status level associated with the incremented counter exceeding the one of a plurality of thresholds;
computer-readable program instructions to determine a new set of benefits associated with the updated status level;
computer-readable program instructions to associate the new set of benefits with the wallet application, wherein the wallet application updates program information associated with a prior status level to new program information associated with the updated status level and wherein updating the program information comprises changing visual elements of a membership card displayed by a mobile computing device; and
computer-readable program instructions to identify one or more offers that correspond to the updated status level.

14. The computer program product of claim 13, further comprising computer-readable program instructions to transmit at least a portion of the new set of benefits to a mobile computing device associated with the wallet application.

15. The computer program product of claim 13, further comprising computer-readable program instructions to transmit the updated status level to a mobile computing device associated with the wallet application.

16. The computer program product of claim 13, wherein the transaction notification is received from one of a mobile computing device or a merchant computing system.

17. The computer program product of claim 13, wherein the new set of benefits comprises a new membership status level.

* * * * *